US010154685B2

(12) United States Patent
Peterson et al.

(10) Patent No.: US 10,154,685 B2
(45) Date of Patent: *Dec. 18, 2018

(54) FREEZE-DRIED AERATED FRUIT OR VEGETABLE COMPOSITIONS AND METHODS OF MAKING THEREOF

(75) Inventors: Scott Peterson, Spring Lake, MI (US); Frank Welch, Kentwood, MI (US); Thomas Burkholder, East Amherst, NY (US)

(73) Assignee: Nestec S.A., Vevey (CH)

( * ) Notice: Subject to any disclaimer, the term of this patent is extended or adjusted under 35 U.S.C. 154(b) by 749 days.

This patent is subject to a terminal disclaimer.

(21) Appl. No.: 13/475,411

(22) Filed: May 18, 2012

(65) Prior Publication Data

US 2012/0276269 A1 Nov. 1, 2012

Related U.S. Application Data

(63) Continuation of application No. 12/650,820, filed on Dec. 31, 2009, now abandoned, which is a continuation-in-part of application No. 12/599,328, filed as application No. PCT/US2008/063306 on May 9, 2008, now Pat. No. 9,968,124.

(60) Provisional application No. 60/916,956, filed on May 9, 2007.

(51) Int. Cl.
| | | |
|---|---|---|
| A23B 7/024 | (2006.01) | |
| A23P 30/40 | (2016.01) | |
| G06Q 99/00 | (2006.01) | |
| A23L 29/10 | (2016.01) | |
| A23L 29/20 | (2016.01) | |
| A23L 19/00 | (2016.01) | |

(52) U.S. Cl.
CPC .............. *A23P 30/40* (2016.08); *A23B 7/024* (2013.01); *A23L 19/09* (2016.08); *A23L 29/10* (2016.08); *A23L 29/20* (2016.08); *G06Q 99/00* (2013.01); *A23V 2002/00* (2013.01)

(58) Field of Classification Search
CPC .......... A23L 1/2128; A23L 1/035; A23L 1/05; A23B 7/024; A23V 2250/182; A23V 2220/192
See application file for complete search history.

(56) References Cited

U.S. PATENT DOCUMENTS

| | | | |
|---|---|---|---|
| 2,955,943 A | 10/1960 | Morgan et al. | |
| 3,313,032 A | 4/1967 | Malecki | |
| 3,492,126 A | 1/1970 | Rubenstein | |
| 3,656,971 A * | 4/1972 | Reimer | 426/659 |
| 3,806,610 A | 4/1974 | Rahman | |
| 4,055,675 A | 10/1977 | Popper et al. | |
| 4,080,477 A | 3/1978 | Tsumara et al. | |
| 4,244,981 A | 1/1981 | Blake | |
| 4,368,211 A | 1/1983 | Blake et al. | |
| 4,386,211 A | 5/1983 | Henderson et al. | |
| 4,515,822 A | 5/1985 | Kraig et al. | |
| 4,542,035 A | 9/1985 | Huang et al. | |
| 4,587,130 A * | 5/1986 | Stauber | 426/564 |
| 4,624,853 A | 11/1986 | Rudin | |
| 4,631,196 A | 12/1986 | Zeller | |
| 4,855,155 A | 8/1989 | Cavallin | |
| 4,889,730 A | 12/1989 | Roberts et al. | |
| 4,891,235 A | 1/1990 | Mizuguchi et al. | |
| 4,946,697 A | 8/1990 | Payne | |
| 4,948,609 A | 8/1990 | Nafisi-Movaghar | |
| 4,956,185 A | 9/1990 | Cajigas | |
| 5,000,974 A | 3/1991 | Albersmann | |
| 5,093,137 A | 3/1992 | Shazer, Jr. et al. | |
| 5,143,096 A | 9/1992 | Steinberg | |
| 5,147,668 A | 9/1992 | Munk | |
| 5,176,928 A | 1/1993 | Shazer, Jr. et al. | |
| 5,451,419 A | 9/1995 | Schwab et al. | |
| 5,518,740 A | 5/1996 | Costanzo et al. | |
| 5,665,413 A | 9/1997 | Rossiter | |
| 5,959,128 A * | 9/1999 | Kolstad et al. | 554/206 |
| 6,183,803 B1 | 2/2001 | Morcol et al. | |
| 6,361,813 B1 | 3/2002 | Kitaoka et al. | |
| 6,713,100 B1 | 3/2004 | Schmoutz et al. | |
| 6,841,181 B2 * | 1/2005 | Jager et al. | 426/61 |
| 6,998,146 B2 | 2/2006 | Murphy et al. | |
| 7,005,157 B2 | 2/2006 | Engesser et al. | |
| 7,005,175 B2 | 2/2006 | Hachenberg et al. | |
| 7,011,861 B2 | 3/2006 | Nair et al. | |
| 7,033,634 B2 | 4/2006 | Engesser et al. | |
| 7,118,772 B2 | 10/2006 | Froseth et al. | |
| 7,264,835 B2 | 9/2007 | Funk | |
| 2002/0192345 A1 | 12/2002 | Kepplinger et al. | |

(Continued)

FOREIGN PATENT DOCUMENTS

| | | |
|---|---|---|
| CA | 994158 A1 | 8/1976 |
| CA | 2183168 | 9/1995 |

(Continued)

OTHER PUBLICATIONS

Functional Foods Fact Sheet: Probiotics and Prebiotics (Oct. 15, 2009. Downloaded from http://www.foodinsight.org/Resources/Detail.aspx?topic=Functional_Foods_Fact_Sheet_Probiotics_and_Prebiotics on Aug. 16, 2012.*
Beech-Nut Carrot, Apple & Mango. 2006. Downloaded from http://web.archive.org/web/20061015193054/http://www.beech-nut.com/Our%20Baby%20Food/product.asp?P=38562&Category=1&SearchValue=4&SearchVals=About%207%20-%208%20Months&ListValue=1&SearchType=By%20Age&ProdType= on Aug. 16, 2012.*
Kuntz, L.A. 1999. "Special Effects With Gums." Food Product Design. Downloaded from http://www.foodproductdesign.com/articles/1999/12/special-effects-with-gums.aspx# on Mar. 11, 2015.*
Tsen, J.-H., King, V.A.-E. 2002. "Density of banana puree as a function of soluble solids concentration and temperature." Journal of Food Engineering. vol. 55. pp. 305-308.*

(Continued)

*Primary Examiner* — Nikki H. Dees
(74) *Attorney, Agent, or Firm* — Gary M. Lobel, Esq.

(57) ABSTRACT

The present invention comprises a freeze-dried, aerated fruit and/or vegetable composition comprising a fruit and/or vegetable ingredient and an emulsifier and methods of making thereof.

14 Claims, No Drawings

(56) References Cited

U.S. PATENT DOCUMENTS

| | | |
|---|---|---|
| 2003/0113436 A1 | 6/2003 | Fukinbara |
| 2003/0194468 A1 | 10/2003 | Konkoly |
| 2003/0224089 A1 | 12/2003 | Engesser et al. |
| 2004/0109933 A1 | 6/2004 | Roy et al. |
| 2004/0110442 A1 | 6/2004 | Rhim et al. |
| 2004/0161522 A1 | 8/2004 | Toves |
| 2006/0013925 A1 | 1/2006 | Bauman et al. |
| 2006/0286209 A1 | 12/2006 | Sweley et al. |
| 2006/0286270 A1 | 12/2006 | Jordan |
| 2007/0071866 A1 | 3/2007 | Cox |
| 2009/0324773 A1 | 12/2009 | Peterson |
| 2011/0183041 A1 | 7/2011 | Barniol et al. |

FOREIGN PATENT DOCUMENTS

| | | | |
|---|---|---|---|
| CA | 2 546 423 | 7/2005 | |
| DE | 1149975 B | 6/1963 | |
| EP | 0 118 048 | 9/1984 | |
| EP | 0 331 281 | 9/1989 | |
| EP | 0 461 718 | 12/1991 | |
| EP | 0 897 670 | 2/1999 | |
| EP | 0649599 B1 | 4/1999 | |
| EP | 1 048 216 | 11/2000 | |
| EP | 1 430 785 | 6/2004 | |
| ES | 2 001 820 | 6/1988 | |
| FR | 2019776 A1 | 7/1970 | |
| GB | 1070060 A * | 5/1967 | ............... A23L 1/34 |
| GB | 1129804 | 10/1968 | |
| GB | 1343640 A | 1/1974 | |
| GB | 1 484 167 | 9/1977 | |
| HU | 195094 | 4/1988 | |
| JP | 55-159752 | 12/1980 | |
| JP | 62083842 A | 4/1987 | |
| JP | 63-14658 | 1/1988 | |
| JP | 02286039 A | 11/1990 | |
| JP | 07-079696 | 3/1995 | |
| JP | 7079696 A | 3/1995 | |
| JP | 9313101 A | 12/1997 | |
| JP | 2000-210042 | 8/2000 | |
| JP | 200145968 A | 2/2001 | |
| JP | 200234462 A | 2/2002 | |
| JP | 2004-222673 | 8/2004 | |
| JP | 2004236612 A | 8/2004 | |
| JP | 2005-053049 | 3/2005 | |
| JP | 2005530499 A | 10/2005 | |
| JP | 2009-148254 | 7/2009 | |
| JP | 2011032673 A | 2/2011 | |
| RU | 1837787 A3 | 8/1993 | |
| SU | 800538 A1 | 1/1981 | |
| WO | 89/12407 | 12/1989 | |
| WO | 95/05085 | 2/1995 | |
| WO | 99/00021 | 1/1999 | |
| WO | 200060950 A | 10/2000 | |
| WO | 00/65935 | 11/2000 | |
| WO | 2001006865 A1 | 2/2001 | |
| WO | 2001019203 A1 | 3/2001 | |
| WO | 01/62099 | 8/2001 | |
| WO | 2001062099 A1 | 8/2001 | |
| WO | 03/028471 | 4/2003 | |
| WO | 03/086092 | 10/2003 | |
| WO | 03/096816 | 11/2003 | |
| WO | 2004040991 A2 | 5/2004 | |
| WO | 2005/096833 | 10/2005 | |
| WO | 2006017363 A1 | 2/2006 | |
| WO | 2008141229 A | 11/2008 | |
| WO | 2008141233 A1 | 11/2008 | |

OTHER PUBLICATIONS

Garcia, et al., "Lowfat Ice Creams from Freeze-Concentrated Versus Heat-Concentrated Nonfat Milk Solids,"1995, J. Diary Sci, 78:2345-2351.

Hartel, et al., "Freeze Concentration of Skim Milk," Journal of Food Engineering 20 (1993) 101-120.

Kumeno, et al., "Production and Characterization of a Pressure-induced Gel from Freeze-concentrated Milk," Biosci. Biotech. Biochem., 57 (5), 750-752, 1993.

Mohamed, et al., "Hard Cheese Making From Camel Milk," Milchwissenschaft 45 (11) 1990, 716-719.

European Search Report for European Application No. 12004794 dated Aug. 3, 2012.

Gerber Graduates. MiniFruits & MiniVeggies. 2005. http://web.archive.org/web/20051026002915/http://gerber.com/toddlersite?tmsdir=food&tmspage=grad_mini.html&tmspromo=2 Downloaded Dec. 8, 2011.

Gerber. Graduates Yogurt Melts—Strawberry. Dec. 18, 2010, pp. 2 http://web.archive.org/web/20101218155236/http://www.gerber.com/AllStages/products/snacks/yogurt_melts_strawberry.aspx.

Harmon, Emily. Gerber Graduates Yogurt Melts: Natural Snacking for Toddlers. Jun. 2, 2008, pp. 3 http://voices.yahoo.com/gerber-graduates-yogurt-melts-natural-snacking-for-1526861.html?cat=25.

McGee. 2004. On Food and Cooking. Scribner. pp. 20,21,632,633.

Nestle Baby. Gerber Graduates Yogurt Melts. 2007. http://web.nestlebaby.com/sg/baby_nutrition/Products/product_detail.htm?stage=0&id=2950 p. 1.

Stevens, A. 2006. "Inulin and Food: Are You Eating Inulin Unknowingly?" The Diet Channel. Downloaded Jul. 19, 2012 from http://www.thedietchannel.com/Inulin-and-Food-Are-You-Eating-Inulin-Unknowingly.htm.

Tsen, J.-H., King, V.A.-E.2002. "Density of banana puree as a function of soluble solids concentration and temperature." J. Food Eng. Vo. 55. pp. 305-308.

International Search Report for International Application No. PCT/US2008/053582 dated Jun. 26, 2008.

U.S. Appl. No. 12/599,328; Scott Peterson, Office Action dated Mar. 23, 2015.

Beech-Nut Corn and Sweet Potato; (2006); Downloaded from https://web.archive.org/web/20060313015338/http://www.beech-nut.com; on Mar. 11, 2015.

Beech-Nut Carrot, Apple & Mango; (2006); Downloaded from https://web.archive.org/web/20060313015338/http://www.beech-nut.com; on Mar. 11, 2015.

* cited by examiner

FREEZE-DRIED AERATED FRUIT OR VEGETABLE COMPOSITIONS AND METHODS OF MAKING THEREOF

INCORPORATION BY REFERENCE

This application is a continuation of U.S. Ser. No. 12/650,820, filed on Dec. 31, 2009, which is a continuation-in-part of and based upon and claims the benefit of priority from U.S. Ser. No. 12/599,328, filed on Nov. 9, 2009, which claims priority to International Application No. PCT/US08/63306, filed on May 9, 2008, which claims priority to U.S. Ser. No. 60/916,956, filed on May 9, 2007, the entire contents of which are incorporated herein by reference.

BACKGROUND

Aerated compositions are known in the art. Aeration can provide desirable characteristics such as light, fluffy textures. It is also known in the art that aerated products are subject to physical and chemical instability and therefore can destabilize over time. One solution to such instability issues in aerated milk-based products includes the addition of a hydrated emulsifier to already cultured dairy products before aeration (See e.g. U.S. Pat. No. 7,005,157, hereinafter "the '157 patent"). Specifically, the '157 patent teaches against adding ingredients directly to the milk blend prior to fermentation because such ingredients can adversely affect processing considerations such as fermentation times. The '157 patent teaches that the addition of a hydrated emulsifier post-fermentation avoids adversely lengthening fermentation times while contributing to stability. Freeze-drying is a process well known in the food industry. It is critical in further drying aerated products that the resulting product retain sensory attributes that are important to consumers. Using the invention taught in the '157 patent, hydration of the aerated product before freeze-drying can detrimentally affect physical stability. For example, a hydrated, aerated product when freeze-dried may result in increased fragility during shipping and handling of the product. Fruit purees are difficult to freeze-dry because of their sugar content. The fruit purees hold onto water, so it is difficult to decouple the sugar and water.

As a further example, dissolvability is an important issue in a freeze-dried product. Specifically, the aerated product, which has been dried and treated with air, must still remain readily dissolvable upon consumption at such a rate as to transfer flavor to the consumer's taste buds. Moreover, the product should be readily dissolvable to reduce the risk of choking hazards for consumers with restricted or underdeveloped oral motor skills or digestive functions. As a known solution, increasing the aeration can improve dissolvability. However, increased aeration has the negative effect of reducing the hardness of the end product. When the hardness is reduced, the physical stability of product can be compromised.

Therefore, there is a need for a product that is freeze-dried and aerated that has improved physical stability and improved dissolvability.

SUMMARY

The present invention comprises a freeze-dried, aerated fruit or vegetable composition comprising a fruit or vegetable ingredient and an emulsifier and methods of making thereof.

Additional features and advantages are described herein, and will be apparent from the following Detailed Description.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

"Freeze-dry" is a dehydration process that works by freezing the material and then reducing the surrounding pressure to allow the frozen water in the material to sublimate directly from the solid phase to gas.

"Aeration" is the process of introducing air to increase gas concentration in liquids. Aeration may be performed by bubbling a gas through the liquid, spraying the liquid into the gas or agitation of the liquid to increase surface absorption.

"Dissolvability" is defined as the change in hardness of a product in going from a dry to a wet state.

"Hardness" is defined as the peak stress prior to fracturing a material. Universal Tester model 4465 with 100 N static load cell, manufactured by Instron in Canton, Mass., is used. The probe used for testing is a compression anvil #2830-011. Initial settings for speed of probe were 1 mm/second to approximately 90% compression. Speed based upon journal article in J. Texture Studies, 36 (2005), pp 157-173, "Effects of Sample Thickness of Bite Force for Raw Carrots and Fish Gels." Testing is repeated on 10-15 replicate samples for each variable.

"Viscosity" is defined as a measure of the resistance of a substance to flow. Viscosity is measured using a Brookfield viscometer with a Helipath® stand with an F-T bar before the composition is aerated. Viscosity aids in holding the shape of a substance through aeration and deposit.

The present invention comprises a fruit and/or vegetable composition useful in the preparation of a freeze-dried, aerated product. The first component of the composition comprises a fruit and/or vegetable ingredient. The fruit and/or vegetable ingredient is selected from any ordinarily known in the art. Preferably, the fruit and/or vegetable ingredient is pureed. The fruit and/or vegetable ingredient is present in amount of from 60% to 98%, preferably from 70% to 90% and most preferably from 60% to 80% of the composition.

The second component of the present composition comprises an emulsifier. While not wishing to be bound by any theories, it is believed that the emulsifier reduces the surface tension at the air-liquid interface, therefore allowing for stable dispersion of air bubbles within the viscous liquid matrix. The emulsifier is preferably a lactylated mono and diglyceride. The lactylated mono and diglyceride is selected from the group consisting of but not limited to lactic and citrate acid esters of mono- and diglycerides, distilled monoglycerides, and combinations thereof. While not wishing to be bound by any theories, it is believed that the lactic acid stays in the water phase and the mono glycerides stay in the hydrophobic phase for whipping agent. The lactylated mono and diglycerides are present in an amount of from 0.001 to 1%, preferably from 0.01 to 0.5% and most preferably from 0.1 to 0.4% of the composition. It is believed that the lactylated mono and diglyceride component of the present invention promotes stabilization of the final aerated composition.

The composition of the present invention can further comprise optional ingredients such as starch, gums, whipping aids, sugars and stabilizers. Starches include but are not limited to tapioca, corn and rice. The rice can be native, physically or chemically modified. Gums include but are not limited to pectin, gelatin, carrageeenan, locust bean gum, guar gum, cellulose gums, microcrystalline cellulose. Whipping aids include but are not limited to lactic acid esters of mono/diglycerides, as well as other acid esters, and other emulsifiers with foam stabilization ability (polysorbate 80), egg white and whey protein.

Hardness, Dissolvability and Viscosity

The consumer preference for the final product of the present invention is believed to be based on physical characteristics such as hardness, viscosity and dissolvability. While each characteristic is important, the correct balance between the three components is desired to optimize the end product of the present invention. Viscosity is defined as a measure of the resistance of a substance to flow. Viscosity is measured using a Brookfield viscometer with a Helipath® stand with an F-T bar before the composition is aerated. It is believed that while the viscosity aids in holding the shape of a substance through aeration and deposit, the hardness aids in physical stability. The dissolvability, also a hardness measurement, is the change in hardness of a product in going from a dry to a wet state. With increased aeration, which aids in dissolvability, the hardness can be negatively affected. The compositions and methods of the present invention have unexpectedly discovered the optimum balance between viscosity, hardness and dissolvability to provide a physically stable and consumer acceptable product.

The composition of the present invention has a hardness value of from 0.5 to 8 pounds force, preferably from 1.5 to 5.5 pounds force.

The composition of the present invention has a dissolvability in the range of from 0.1 to 8 peak load.

The composition of the present invention has a viscosity of from 1,000 to 100,000 cp, dependent upon the temperature and speed of the viscometer used to measure the viscosity. In the preferred embodiment, the viscosity of the wet composition ranges from 30,000 to 60,000 cp at a 10 RPM speed of the spindle 6 in a Brookfield Viscometer. The most preferred range is from 35,000 to 50,000 cp The present invention further provides a method of marketing such compositions to children to promote child development, increase child development through providing developmentally appropriate size, shape and dissolution characteristics. Further, the present invention provides a method of providing probiotics to a child through the compositions disclosed herein. It should be understood that the main ingredient in the compositions can be from the group comprising fruit, vegetables, grains, proteins, dairy, dairy substitutes and any combinations thereof.

Method of Making

A method of preparing a freeze-dried, aerated fruit and/or vegetable product comprising the steps of (a) providing a fruit and/or vegetable blend, (b) adding an emulsifier, (c) thermally processing the fruit and/or vegetable blend, (d) fermenting the blend, (e) admixing a gas with the blend, (f) simultaneously aerating the gas and the fruit and/or vegetable blend to form an aerated product, and (g) cooling the product; and (h) freeze-drying the product. Step (f) is included as an optional step.

Example 1

| Puree Melts - Apple Strawberry | | | |
|---|---|---|---|
| STEP 1 - Puree Melts Blending Component | SA Number | Supplier | % of formula |
| Apple Puree, (1.5 brix) | IP 04354 | Gerber | 55 |
| White Grape Juice Concentrate, (68 brix) | SA00298 | San Joaquin Valley Conc. | 7.5 |
| Strawberry Puree, Seedless, Organic | SA04786 | Cal Pacific | 12 |
| Tapioca Starch | Novation 3300 | National Starch | 1 |
| Pectin, High Methoxy | SA00458 | CP Kelco | 0.75 |
| Lactic Acid Esters of Mono/Diglycerides | SA70271 | Denisco | 0.4 |
| Citric Acid | SA00176 | Tate and Lyle | 0.1 |
| Ascorbic Acid | SA00886 | Weisheng | 0.1 |
| Water | SA00000 | | 18.65 |
| TOTAL | | | 95.5 |

Procedure:

1. Preblend starch, Pectin and LACTEM with water using high shear blender (such as bredo).
2. Add ascorbic acid and citric acid to mixture.
3. Slow blender speed to low and add white grape juice concentrate.
4. Finally, add apple puree and strawberry puree and blend on low speed 1 min.
5. Run puree blend through plate pastuerizer preheater, then homogenize 2500/500 psi (2-stage).
6. Thermally process puree mix at 190 deg F. for 2-8 minutes.
7. Cool to 41 deg. F.
8. Mixture can be deposited unaerated or aerated.
9. To Aerate, pump through Mondomix Aerator and admix nitrogen gas to target of 30-60% overrun.
10. Deposit as drops, 0.8-1.2 grams weight, onto solid steel freezer belt and freeze.
11. Freeze dry frozen drops.

The composition described above is made using the methods described herein.

It should be appreciated that the present invention is not limited to the specific embodiments described above, but includes variations, modifications and equivalent embodiments defined by the following claims.

The invention is claimed as follows:

1. A freeze-dried, aerated product sized and shaped for consumption by a child, the product comprising:
   (a) at least one ingredient selected from the group consisting of a fruit, a vegetable, and combinations thereof, wherein the at least one ingredient is present in an amount from 60% to 80% by weight of the product prior to freeze-drying;
   (b) an emulsifier selected from the group consisting of a lactic acid ester of monoglycerides and diglycerides, a citric acid ester of monoglycerides and diglycerides, distilled monoglycerides, and combinations thereof;
   (c) a starch from a source selected from the group consisting of tapioca, rice, corn, and combinations thereof; and
   (d) a gum selected from the group consisting of pectin, gelatin, carrageenan, cellulose gum, microcrystalline cellulose, and combinations thereof; and
   wherein the product is formed into a plurality of drops prior to freeze-drying, wherein the drops have a weight in a range of from 0.8 to 1.2 grams prior to freeze-drying, and wherein the product is designed to be readily dissolvable upon consumption so as to increase child development by having a developmentally appropriate size, shape, and dissolution characteristics, and wherein the product is designed to reduce the risk of choking hazards for children with restricted or underdeveloped oral motor skills or digestive functions, the freeze-dried, aerated product having a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the product is aerated.

2. The product of claim 1, wherein the viscosity of the product is from 30,000 to 60,000 cp when wet.

3. The product of claim 1, wherein (a) comprises at least one fruit and at least one vegetable.

4. The product of claim 1, wherein (b) is present in an amount of from 0.001% to 1% by weight of the product prior to freeze-drying.

5. The product of claim 1, wherein (c) is present in an amount of about 1% by weight of the product prior to freeze-drying.

6. The product of claim 1, wherein (d) comprises gelatin.

7. The product of claim 1, further defined as a snack product.

8. The product of claim 1, further comprising a probiotic.

9. A freeze-dried, aerated product sized and shaped for consumption by a child, the product comprising:
- (a) at least one ingredient selected from the group consisting of a fruit, a vegetable, and combinations thereof, wherein the at least one ingredient is present in an amount from 60% to 80% by weight of the product prior to freeze-drying;
- (b) an emulsifier selected from the group consisting of a lactic acid ester of monoglycerides and diglycerides, a citrate acid ester of monoglyceridies and diglycerides, distilled monoglycerides, and combinations thereof, wherein the emulsifier is present in an amount of from 0.001% to 1% of the product prior to freeze-drying;
- (c) a starch from a source selected from the group consisting of tapioca, rice, corn, and combinations thereof, wherein the starch is present in an amount of about 1% of the product prior to freeze-drying; and
- (d) a gum selected from the group consisting of pectin, gelatin, carrageenan, cellulose gum, microcrystalline cellulose, and combinations thereof; and wherein the product is formed into a plurality of drops prior to freeze-drying, wherein the drops have a weight in a range of from 0.8 to 1.2 grams prior to freeze-drying, and wherein the product is designed to be readily dissolvable upon consumption so as to increase child development by having a developmentally appropriate size, shape, and dissolution characteristics, and wherein the product is designed to reduce the risk of choking hazards for children with restricted or underdeveloped oral motor skills or digestive functions, the freeze-dried, aerated product having a hardness value of from 0.5 to 8 pounds force peak load, a dissolvability in the range of from 0.1 to 8 pounds force peak load, and a viscosity of from 1000 to 100,000 cp as measured at a 10 rpm speed of the spindle 6 in a Brookfield viscometer before the product is aerated.

10. The product of claim 9, wherein the viscosity of the product is from 30,000 to 60,000 cp when wet.

11. The product of claim 9, wherein (a) comprises at least one fruit and at least one vegetable.

12. The product of claim 9, wherein (d) comprises gelatin.

13. The product of claim 9, further comprising a probiotic.

14. The product of claim 9, further defined as a snack product.

* * * * *